US009170706B2

(12) United States Patent
Scott et al.

(10) Patent No.: US 9,170,706 B2
(45) Date of Patent: Oct. 27, 2015

(54) QUERY BOX POLYMORPHISM (75) Inventors: Matthew Robert Scott, Beijing (CN);
Tzuwei Shih, Beijing (CN); Yaping Liu,
Beijing (CN)

(73) Assignee: Microsoft Technology Licensing, LLC,
Redmond, WA (US)

( * ) Notice: Subject to any disclaimer, the term of this patent is extended or adjusted under 35 U.S.C. 154(b) by 429 days.

(21) Appl. No.: 13/106,732

(22) Filed: May 12, 2011

(65) Prior Publication Data
US 2012/0290967 A1   Nov. 15, 2012

(51) Int. Cl.
G06F 3/048 (2013.01)
G06F 3/0481 (2013.01)
G06F 17/30 (2006.01)
G06F 9/44 (2006.01)

(52) U.S. Cl.
CPC ............ *G06F 3/0481* (2013.01); *G06F 9/4446* (2013.01); *G06F 17/30967* (2013.01)

(58) Field of Classification Search
CPC    G06F 3/0481; G06F 17/30967; G06F 9/4446
USPC ......................................................... 715/780
See application file for complete search history.

(56) References Cited

U.S. PATENT DOCUMENTS

| 6,009,459 | A | 12/1999 | Belfiore et al. |
| 6,208,339 | B1 * | 3/2001 | Atlas et al. .................... 715/780 |
| 7,788,594 | B1 * | 8/2010 | Tevanian, Jr. ................. 715/780 |
| 2007/0162422 | A1 * | 7/2007 | Djabarov ........................... 707/2 |
| 2007/0174286 | A1 * | 7/2007 | Seitz et al. ...................... 707/10 |
| 2008/0109752 | A1 * | 5/2008 | Bayley et al. ................. 715/800 |
| 2008/0215976 | A1 * | 9/2008 | Bierner et al. ................ 715/708 |
| 2008/0243704 | A1 * | 10/2008 | Ruef et al. ....................... 705/74 |
| 2008/0270932 | A1 * | 10/2008 | Diaz et al. ..................... 715/780 |
| 2010/0010980 | A1 | 1/2010 | Dettinger et al. |
| 2010/0070482 | A1 * | 3/2010 | Punaganti Venkata et al. ............................... 707/706 |
| 2010/0076984 | A1 * | 3/2010 | Papadopoullos et al. ..... 707/749 |
| 2010/0094856 | A1 * | 4/2010 | Rodrick et al. ............... 707/706 |
| 2010/0105370 | A1 * | 4/2010 | Kruzeniski et al. ........ 455/414.3 |
| 2010/0241947 | A1 * | 9/2010 | Dahn et al. .................... 715/233 |
| 2011/0087686 | A1 * | 4/2011 | Brewer et al. ................. 707/766 |
| 2011/0225502 | A1 * | 9/2011 | Blahaerath et al. ........... 715/739 |
| 2012/0173566 | A1 * | 7/2012 | D'Angelo et al. ............ 707/769 |

OTHER PUBLICATIONS

Adding a Text Box, <<http://msdn.microsoft.com/en-us/library/aa237311%28SQL.80%29.aspx>>, Jan. 5, 2011.

(Continued)

*Primary Examiner* — Anil Bhargava
(74) *Attorney, Agent, or Firm* — Stephen A. Wight; Judy Yee; Micky Minhas (57) ABSTRACT

Tools and techniques for a polymorphic query box operating on a computing device are described herein. The polymorphic query box application provides an adaptive query box via a single graphical user interface that detects an input scenario based on the type of input received via the polymorphic query box. In accordance with the detected scenario, the polymorphic query box dynamically changes appearance and function. In some implementations, the techniques include the polymorphic application ordering web search and/or translation based on the input being received. In some implementations, the techniques include providing context sensitive controls for input editing before completing the query.

18 Claims, 10 Drawing Sheets

(56) References Cited

OTHER PUBLICATIONS

Google Goes Loooooooooooonger, Supersizes Its Search Box, <<http://mashable.com/2009/09/09/google-supersized/>>, Jan. 5, 2011.

How to Change the Size of the Windows 7 Explorer Address and Search Bar, <<http://www.sevenforums.com/tutorials/3339-windows-explorer-address-search-bar-change-size.html>>.

Idee Labs, <<http://labs.ideeinc.com/>>, retrieved on Feb. 22, 2011.

Searchbar Autosizer—Expand/Increase Search Field size of Firefox Toolbar Dynamically, <<http://pcsplace.com/firefox/searchbar-autosizer-expand-increase-search-field-size-of-firefox-toolbar-dynamically/>>, Jan. 5, 2011.

TinEye—About, <<www.tineye.com/about>>, retrieved on Feb. 22, 2011.

TinEye—FAQ, <<www.tineye.com/faq>>, retrieved on Feb. 22, 2011.

TinEye Home page, <<www.tineye.com>>, retrieved on Feb. 22, 2011.

* cited by examiner

QUERY BOX POLYMORPHISM

BACKGROUND

Traditionally a query box performs operations that are limited by presentation context within a web interface. Typical query boxes are programmed to take textual input and return results consistent with the web interface in which they are presented. Thus, traditionally, when one wanted to perform a web search, the query text was entered via the search box of the web browser interface, when one wanted to look up a word in a dictionary, the person first browsed to a dictionary site and then entered the word in a query box of the dictionary site, when one wanted to obtain a translation, the person first browsed to a translation site and then entered the text for translation in a query box of the translation site. On the translation site, results were returned in the language selected from a list of languages or in the language of the site itself.

Conventional image search is based on textual keywords. From an image search interface, the text "book," will return images of books. Another approach to image search today is link based. In link based search, an image search is conducted from receiving entry of a uniform resource locator (URL) or browsing a file path in a specific image search interface.

The traditional query box is a limiting UI metaphor where users can just input text, and a certain form and amount of text. In each instance, in addition to contextual limitations, the query entry is limited by the constraints of the query box, itself.

In typical web browsers, the client is simple and merely serves as an entry point to the server that takes the query for processing based on the interface provided by the server. On the client side, the query box is a static interface with little functionality. Although some search engines provide adaptive results based on short textual input, e.g., "Weather in NY," or "1+1," they typically respond to one line of input, and when more than one line of input is received, it is truncated. Today's query boxes do not provide an adaptive query box on the client. This limits the types of questions a search engine can answer through a single interface. Thus, typically obtaining answers to a variety of types of questions and a variety of types of input requires accessing multiple interfaces.

SUMMARY

Described herein are a polymorphic query box and techniques and tools that implement the polymorphic query box on a client device. The polymorphic query box provides an adaptive query box via a single user interface that detects an input scenario based on the type of input received via the polymorphic query box. In accordance with the detected scenario, the polymorphic query box dynamically changes appearance and function.

This summary is provided to introduce a selection of concepts in a simplified form that are further described below in the Detailed Description. This Summary is not intended to identify key or essential features of the claimed subject matter; nor is it to be used for determining or limiting the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

The disclosure describes a user interface that includes a polymorphic query box and techniques and tools that implement the polymorphic query box on the client side for a variety of input scenarios. The polymorphic query box detects an input scenario based on the type of input submitted via the polymorphic query box. The polymorphic query box changes appearance and function dynamically in accordance with the detected scenario. For instance, the polymorphic query box detects a query for machine translation and expands automatically to contain long queries in an online dictionary/translator scenario. Thus, the polymorphic query box provides a single query box that handles regular queries such as for a translation dictionary lookup as well as long translation queries so that a user does not have to make a conscious decision to go to a separate translation interface.

In some implementations a polymorphic query box detects input scenarios including translation scenarios, web search scenarios, image search scenarios, and mapping scenarios. For example, when the polymorphic query box receives textual input in one language while the user interface is being displayed in another language, textual manipulation tools are provided for query refinement before the query is sent for translation. As another example, when the polymorphic query box receives a short textual query in the same language in which the user interface is being displayed, with "short" being below a programmable threshold that, in some instances, is client device driven based on screen size and resolution, auto-complete options are provided until the amount of textual input meets the programmable threshold. As another example, when the polymorphic query box receives an image input, image editing tools are provided for image refinement before a visual or image search is conducted. As yet another example, when the polymorphic query box receives a map input, tools are provided for geolocation refinement before a geolocation search is conducted. When the polymorphic query box receives an input that exceeds the presentation of the query box in terms of size or number of characters, the polymorphic query box detects the large input and changes appearance and in some instances target functionality to enhance user experience via a single user interface. Herein such an adaptive query box may be called a polymorphic query box.

In some implementations, to ensure effective query box adaptation, keystrokes and/or binary headers are precisely tracked or watched. For example, when the number of textual characters received via the polymorphic query box exceeds the number that are visible via the initial query box for the client device, the polymorphic query box changes to an expanded query box. When binary input is detected, the header is examined to determine the type of input, e.g., image, map, and the polymorphic query box changes to an expanded query box. When the size of input overflows the expanded query box, scroll bars are provided for the polymorphic query box.

In the example that a user types or pastes in a large amount of text, the polymorphic query box expands. If some of the text is removed so that no more than a line of text remains, the box retracts to its original size. In the example that a user pasts in an image, the box changes to accommodate the image, and if the image is removed, the box reverts to the original query box.

The discussion below begins with a section entitled "Example Computing Architecture," which describes one non-limiting environment that may implement the described techniques. Next, a section entitled "Example User Interface" presents several examples of a polymorphic query box user interface. A third section, entitled "Example Processes" presents several example processes for query box polymorphism. A brief conclusion ends the discussion.

This brief introduction, including section titles and corresponding summaries, is provided for the reader's convenience and is not intended to limit the scope of the claims, nor the proceeding sections.

Example Computing Architecture

Figure 1:
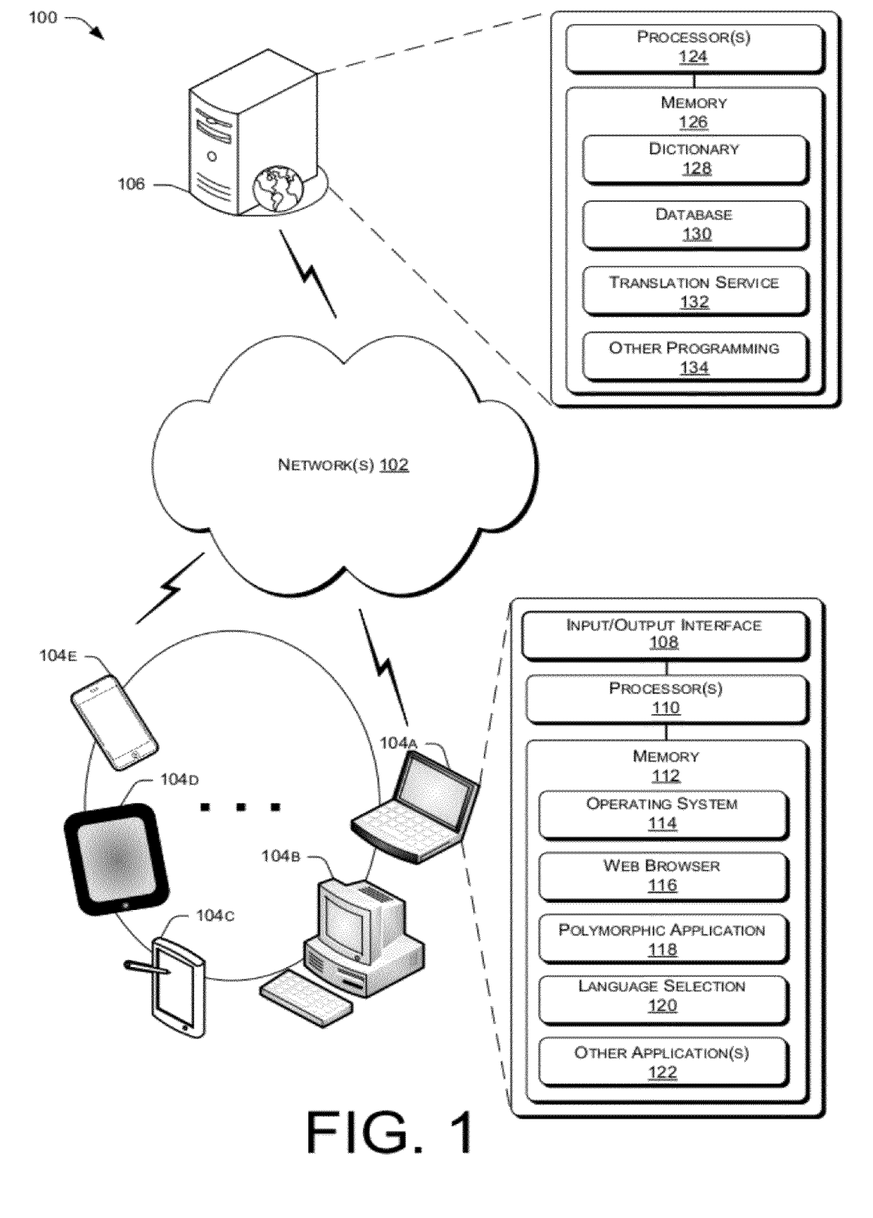
FIG. 1 illustrates an example architecture including a hardware and logical configuration of a client computing device and a server according to some implementations.

FIG. 1 illustrates an example computing architecture 100 in which techniques for query box polymorphism may be implemented. The architecture 100 includes a network 102 over which a client computing device 104 may be connected to a server 106. The architecture 100 may include a variety of computing devices 104 as client computing devices. As illustrated, the computing device 104 includes an input/output interface 108 coupled to one or more processors 110 and memory 112, which can store an operating system 114 and one or more applications including a web browser application 116, a polymorphic application 118, a language selection application 120, and other applications 122 for execution by processors 110. In the illustrated example, server 106 includes one or more processors 124 and memory 126, which may store one or more dictionaries 128, one or more databases 130, a translation service 132, and one or more other instances of programming 134.

While FIG. 1 illustrates computing device 104a as a laptop-style personal computer, other implementations may employ a personal computer 104b, a personal digital assistant (PDA) 104c, a thin client 104d, a mobile telephone 104e, a portable music player, a game-type console (such as Microsoft Corporation's Xbox™ game console), a television with an integrated set-top box 104f or a separate set-top box, or any other sort of suitable computing device or architecture.

Memory 112, meanwhile, may include computer-readable storage media. Computer-readable media includes, at least, two types of computer-readable media, namely computer storage media and communications media.

Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device such as computing device 104.

In contrast, communication media may embody computer readable instructions, data structures, program modules, or other data in a modulated data signal, such as a carrier wave, or other transmission mechanism. As defined herein, computer storage media does not include communication media.

Polymorphic application 118 represents a desktop application or other application having logic processing on the client device. Language selection application 120 and other applications 122 may represent desktop applications, web applications provided over a network 102, and/or any other type of application capable of running on computing device 104. Network 102, meanwhile, is representative of any one or combination of multiple different types of networks, interconnected with each other and functioning as a single large network (e.g., the Internet or an intranet). Network 102 may include wire-based networks (e.g., cable) and wireless networks (e.g., Wi-Fi, cellular, satellite, etc.).

As illustrated, computing device 104 implements a polymorphic application 118 with a user interface that adapts to the input received. The user interface of polymorphic application 118 includes displaying a query box on a screen of computing device 104 that, in some instances, changes functionality of an application such as web browser 116 and/or language selection application 120, responsive to input received via input/output interface 108. In other implementations language selection application 120 may be integrated in polymorphic application 118 and/or polymorphic application 118 may be integrated in web browser 116. In contrast to typical web browsers, polymorphic application 118 executes on client device 104. Placing polymorphic application 118 on client device 104 improves the search experience end-to-end.

In several implementations polymorphic application 118 operates on client device 104 from a web page. Polymorphic application 118 exists as java script on client 104 in the web page and a search engine works in a way that is complementary to the polymorphic 118 on client 104 and the web page. For example, client 104 via polymorphic 118 is responsible for formulating decisions and changing browser requests based on implied intent of the user. Meanwhile, the search engine delivers the search as directed by polymorphic 118 on client device 104 to server 106. Server 106 responds to the intent determined at client 104.

Polymorphic application 118 can be implemented in mobile devices such as smart phones, thin clients, netbooks, etc. in a variety of platforms using .net, C#, objective C, Java, and/or other programming environments.

Example User Interface

Various illustrative techniques may be employed to enhance user experience while using query boxes. The illustrated techniques include enhancing user experience via a user interface providing one or more clues that a query box is a polymorphic query box. As shown various instructional text and/or subtle graphical clues are presented to assist users in discovery of the polymorphic capabilities of the polymorphic query box.

In at least one instance, the described various instructional text are presented with, or responsive to, user interaction with the subtle graphical clues. For instance, responsive to a mouse hover over a subtle polymorphic indicator, the user interface presents a question icon. Provided that the mouse continues to hover on the polymorphic indicator, additional instructional text is presented proximate the question icon.

Figure 2A:
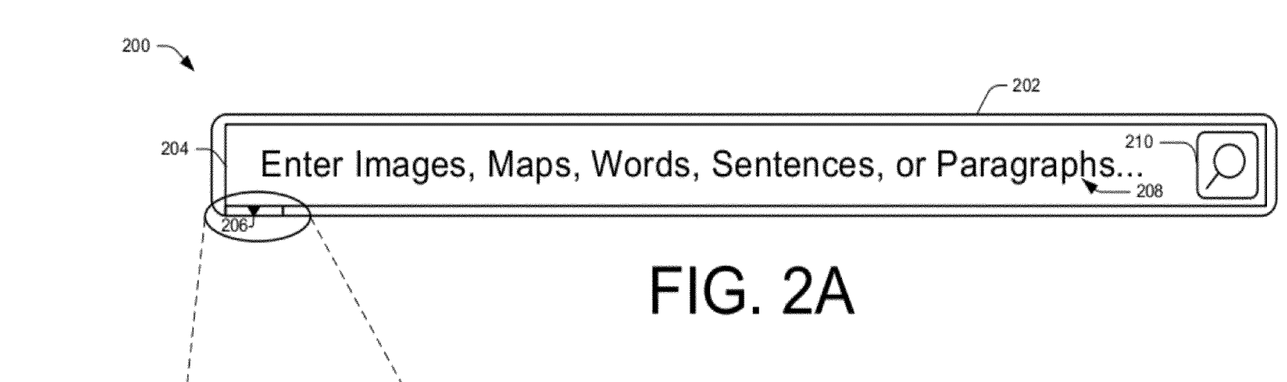
FIGS. 2a-2c illustrate examples of a polymorphic query box user interface.
Figure 2B:
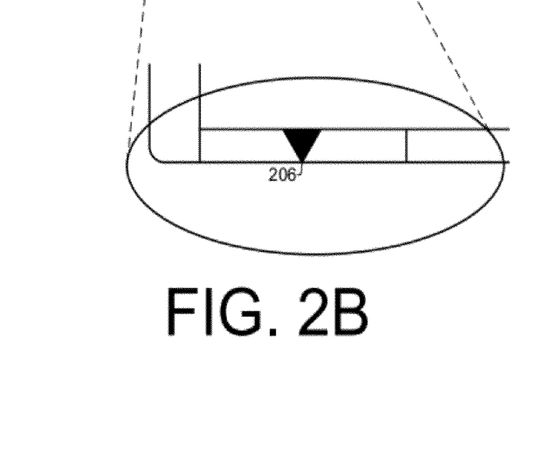
Figure 2C:
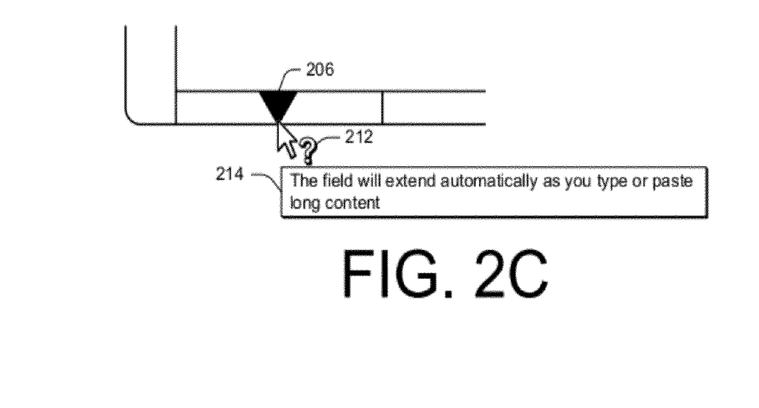

FIGS. 2a-2c illustrate an example 200 of a polymorphic query box user interface.

As shown in FIG. 2a, a polymorphic query box 202 (e.g., which provides access to one or more of polymorphic application 118 or language selection application 120 via web browser 116 or similar logic on a client device 104) includes an inner field 204 and a polymorphic indicator 206. FIG. 2b presents a zoomed view of an example of a polymorphic indicator 206.

The user interface illustrated in FIG. 2a includes instructional text 208, also known as gray text, within the inner field 204. The instructional text 208 helps a user recognize that the query box is a polymorphic query box interface by mentioning that the polymorphic query box can accept a variety of inputs. Then, when inner field 204 of the query box obtains focus, for example via a mouse click, instructional text 208 is replaced by the query input being received. When the query input is typed an auto-complete functionality is activated to provide a shortcut for the user typing the query. Users appreciate this auto-complete functionality when typing in non-intuitive interfaces, on small or less efficient keyboards, and when inputting text in a foreign language, particularly when the language of the input uses a different alphabet, such as Han or Arabic script when the user's native language uses the Roman alphabet, or the reverse.

However, auto-complete is not appropriate for all queries. For example, polymorphic application 118 turns off the auto-complete functionality when image query or map query scenarios are detected in inner field 204. In addition, when input text exceeds a boundary, for example, one line in inner field 204 of polymorphic query box 202, auto-complete may be disabled based on the length of the input and/or the size of the query box displayed. In one example implementation, when a large amount of text is typed or copied into inner field 204 of polymorphic query box 202, machine translation is activated and auto-complete is deactivated.

A query icon 210 is presented for a user to complete and send a query, although in various implementations sending the query may be completed by pressing or selecting "enter" via a keyboard or other entry interface. Although illustrated relative to the upper right corner of the polymorphic query box in FIG. 2 and the figures to follow, in some implementations query icon 210 moves, floats, and/or is repositionable in the user interface. In response, to completing the query, polymorphic application 118 sends the query to server 106 to obtain a query answer. For example, in the machine translation scenario, in response to the query being completed as indicated by receiving a click on query icon 210 or "enter" selection when inner field 204 has focus, polymorphic application 118 sends the query to a translation service, such as translation service 132 illustrated on server 106.

FIG. 2C illustrates a mouse hover over polymorphic indicator 206, responsive to which the polymorphic query box 202 user interface presents a question icon 212 with a help cursor. Furthermore, responsive to the mouse continuing to hover on polymorphic indicator 206, additional instructional text 214 is presented proximate question icon 212. In some implementations, a selection of or a click on polymorphic indicator icon 206 may result in presentation of additional instructional text 214.

Figure 3:
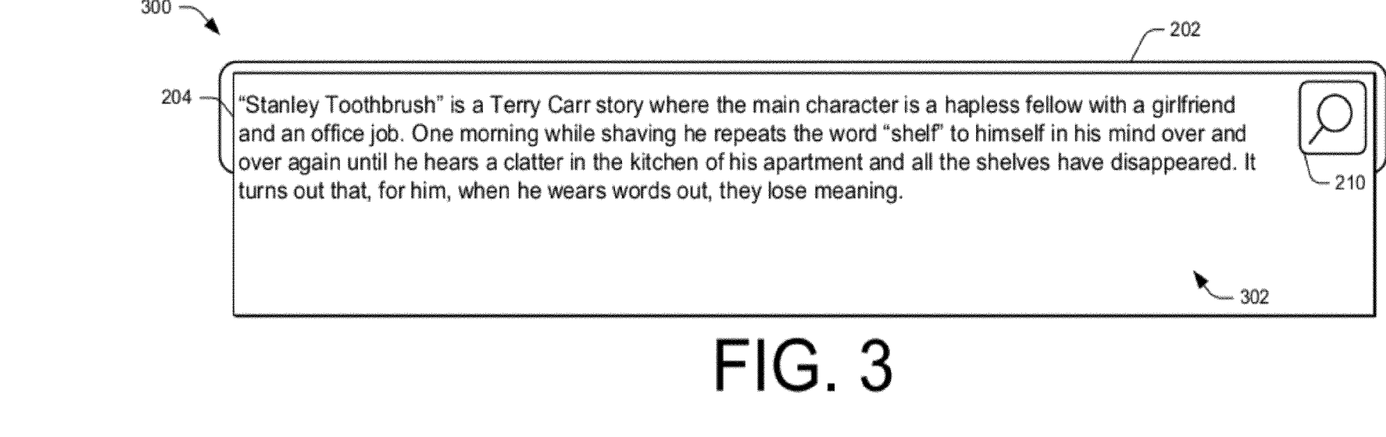
FIG. 3 illustrates an example expanded polymorphic query box with textual input.

FIG. 3, at 300, illustrates an example polymorphic query box 202 having an expanded inner field 204 with textual input 302. As shown, inner field 204 of polymorphic query box 202 is expanded and auto-complete has been disabled due to the amount of text exceeding a first threshold. The first threshold is programmable, and in the illustrated example, the first threshold is exceeded by more text being entered than the visible entry area can show on one line. Via the expanded inner field 204, polymorphic application 118 provides an opportunity for the user to edit and complete the query before sending as, for example, a search query or a request for machine translation.

In one non-limiting example, a user may copy or type several paragraphs of text into the inner field of the polymorphic query box. When input on a new line is desired, "shift+enter" or another suitable shortcut is provided in the interface so that the user has control over the query input at the client device until the query is sent. Before sending the query, the text is editable and terms, lines of text, or entire paragraphs can be added or removed. In some instances the polymorphic query box interface provides a separate or integrated window to intermediate query results. For example, when a user is searching for technical information, the text in the inner box may be retained for further query refinement. After query icon 210 has been selected, in this example a separate or integrated results section may present results for the query that was sent, and based on the results, the user may edit the text in the polymorphic query box to revise the results—all from a single polymorphic query box 202.

In each device an amount of text that the polymorphic query box can show in expanded form is limited by a second threshold. Because that that second threshold may be less than the polymorphic application can process, the polymorphic query box also provides overflow behavior.

Figure 4:
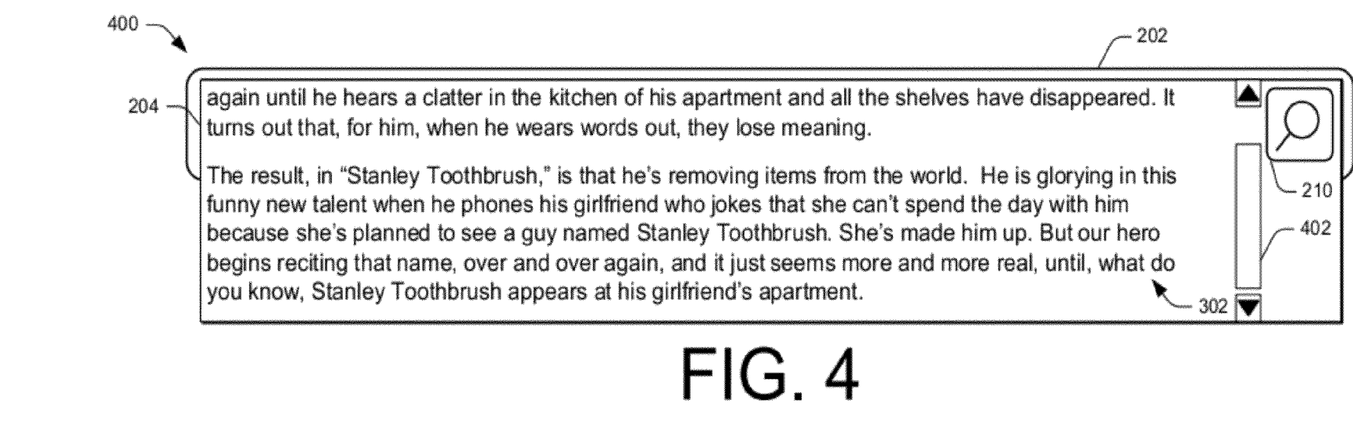
FIG. 4 illustrates an example overflowed polymorphic query box with textual input.

FIG. 4, at 400, illustrates an example overflowed polymorphic query box 202 having an expanded inner field 204 that has reached the second threshold with the textual input 302. In the case of text in inner field 204 of polymorphic query box 202 exceeding the second threshold, a scroll bar 402 is added to inner field 204. Scroll bar 402 provides visual feedback to the user that their input 302 has exceeded the predetermined threshold.

Figure 5:
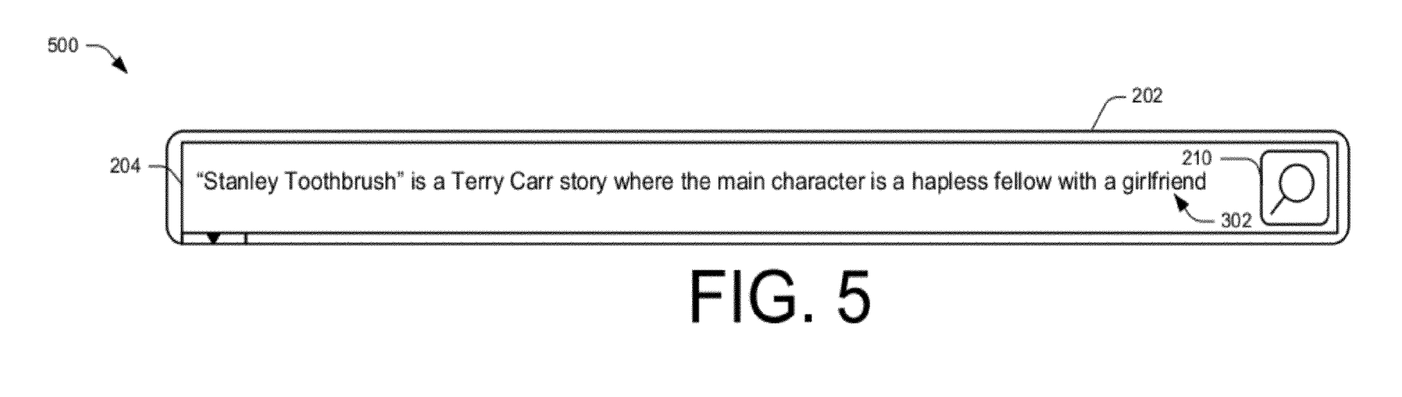
FIG. 5 illustrates an example retracted polymorphic query box with textual input upon losing focus.

FIG. 5, at 500, illustrates an example retracted inner field 204 upon inner field 204 losing focus. Responsive to receiving a click on query icon 210, or a user clicking outside inner field 204, inner field 204 retracts to its initial size. Meanwhile, textual input 302 remains stored by polymorphic application 118, although not all of the textual input 302 is visible on device 104.

Figure 6:
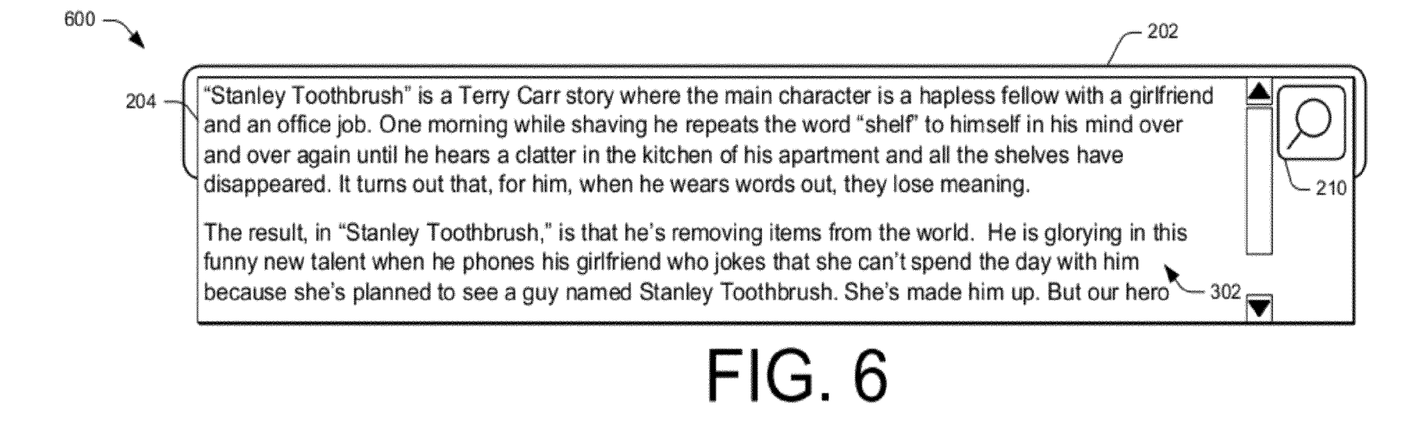
FIG. 6 illustrates an example overflowed polymorphic query box with textual input upon regaining focus.

FIG. 6, at 600, illustrates an example of inner field 204 regaining focus after having reached the second threshold with textual input 302. Text 302 is shown from the beginning of the input when inner field 204 regains focus.

Figure 7:
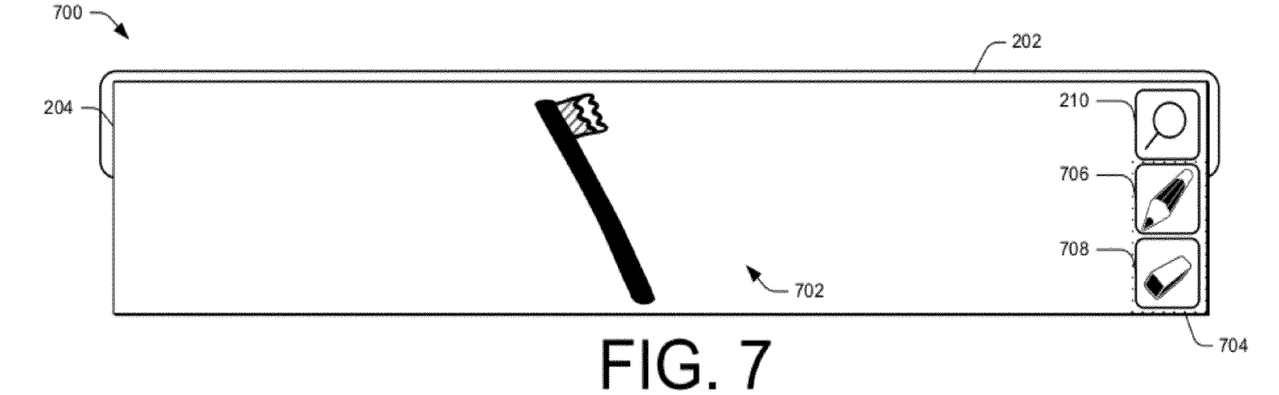
FIG. 7 illustrates an example expanded polymorphic query box with image input.

FIG. 7, at 700, illustrates an example expanded inner field 204 of polymorphic query box 202 with an image input 702 relating to text 302. When an image 702 is copied into inner field 204, a watcher code in polymorphic application 118 detects that an image scenario is desired. For example, in some implementations, an image scenario is detected based on detecting binary data indicating non-textual input in inner field 204 of polymorphic query box 202. The header or preamble of the binary indicates a type of the data, e.g., an image or a map.

Responsive to polymorphic application 118 detecting an image scenario, the query box presents controls tailored to the image scenario. In FIG. 7 a dotted box has been added to delineate an example controls section 704. When a button in the controls section gains focus rather than inner field 204 retracting from losing focus, the controls allow the user to edit the input in inner field 204. In the image example presented in at 700, a pencil tool 706 and an eraser tool 708 are illustrated as examples, although other examples, not shown, may include an area selection tool, a cropping tool, a color selection tool, and other image appropriate editing tools. Furthermore, controls section 704 may be presented in other locations of the user interface, for example above and/or below polymorphic query box 202. The image editing controls allow a user to edit the image in the polymorphic query box before sending it as a completed query by clicking or otherwise activating query icon 210.

In one non-limiting example, a group photograph pasted in the polymorphic query box may be edited to only present selected people that may then be submitted as an image search. In some instances the polymorphic query box provides a window to intermediate query results. For example, when a user is searching for people in a group photo, the image in inner field 204 may be retained for further query refinement. In this example an integrated or separate results section may present results for the query that was sent, and based on the results, the user may edit the image within inner field 204 to revise the results, for example by erasing or cropping the group to present an individual person—all from the single polymorphic query box.

While the illustrated example shows image 702 resized to fit the expanded inner field 204, in some implementations, image 702 may be presented with a scrolling interface rather than being resized. Similarly, in various implementations when the query is completed by clicking query icon 210 or pressing enter, inner field 204 is retracted and just a top portion of image 702 is presented or the image is resized or replaced with a description of the image created from the binary header data.

Figure 8:
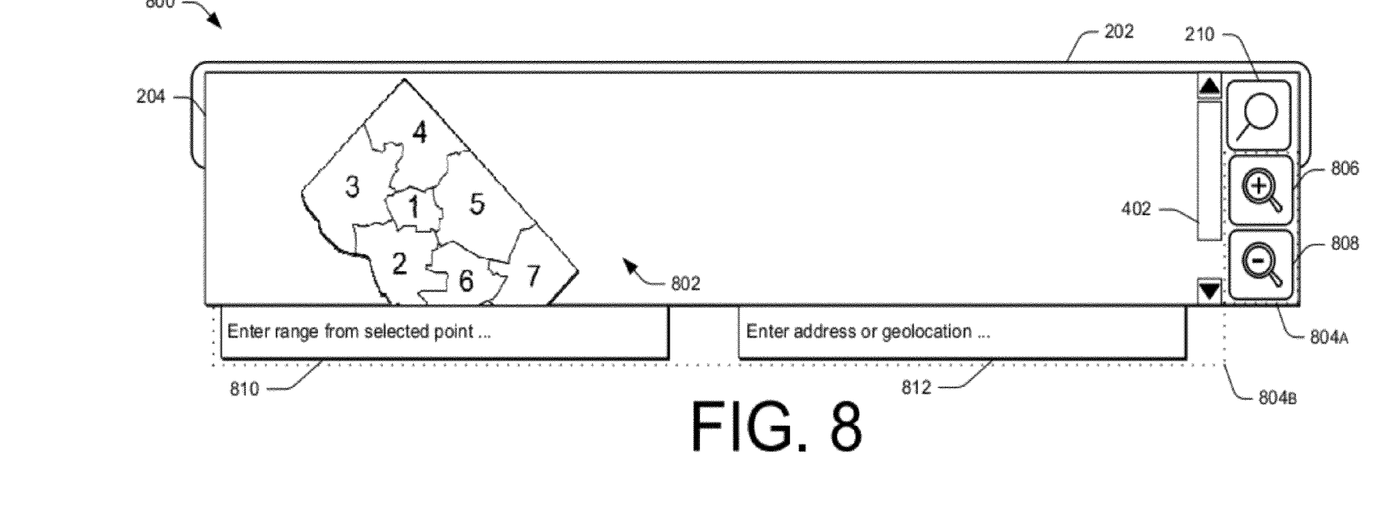
FIG. 8 illustrates an example overflowed polymorphic query box with map input.

FIG. 8, at 800, illustrates an example expanded polymorphic query box with a map input such as the illustrated District of Columbia Ward map. In various instances other types of maps including a geographical, city, or transportation system map may be received as input. When a map 802 is copied in inner field 204 of polymorphic query box 202, a watcher code in polymorphic application 118 detects that a map scenario is desired. For example, in some implementations, a map scenario is detected based on detecting binary data indicating non-textual input in inner field 204. The header or preamble of the binary indicates a type of the data, e.g., an image or a map.

Responsive to detecting a map scenario, the polymorphic application 118 adds controls tailored to the map scenario to polymorphic query box 202. Again, in the example of FIG. 8, a dotted box has been added to delineate a controls section 804. As illustrated in FIG. 8, in some instances the interface presents a multipart controls section. When a button in the controls section gains focus rather than inner field 204 retracting from losing focus, the controls allow the user to edit the input in inner field 204.

In controls section 804a, a zoom in tool 806 and a zoom out tool 808 are illustrated as example controls, although other examples may include an area selection tool, a cropping tool, a color selection tool, and other map appropriate controls, etc. Furthermore, the controls section 804 includes a second section of map specific controls presented below inner field 204 in control section 804b.

The example map specific controls presented in controls section 804b each include instructional or gray text as discussed earlier. Control 810 provides an interactive control for the user to enter a range, e.g., 1 km, 3 km, 5 km, etc., and then select a point on a map, e.g., by clicking in the map, or to select a point in the map, e.g., by clicking in the map, and then to request a range from that point e.g., 1 km, 3 km, 5 km, etc. Meanwhile, control 812 allows a user to enter a specific address or geolocation to pinpoint a location on the map.

While the illustrated example shows scroll bar 402, in some implementations, map 802 may be resized rather than presenting a scrolling interface. Similarly, in various implementations when the query is completed by clicking query icon 210 or pressing enter, inner field 204 is retracted and just a top portion of map 802 is presented or the map 802 is resized or replaced with a description of the map created from the binary header data.

As discussed earlier, controls may be presented at other locations of the user interface, for example above or integrated into the polymorphic query box. Such controls include attribute controls such as photographic views, traffic views, cartoon view, etc. While those options are sometimes found on a search results page, having them as part of the query itself helps the user think about what they want to do and makes the results process more efficient for the user. The map controls allow a user to manipulate the map in the polymorphic query box before sending it as a completed query by clicking or otherwise activating the query icon 210.

In one non-limiting example, a map 802 pasted in inner field 204 may be edited to present a selected area, such as a single ward in the District of Columbia Ward map presented for illustration at 802. In some instances the polymorphic application 118 provides a separate or integrated window to intermediate query results. For example, when a user is searching for a location, the map in inner field 204 may be retained by polymorphic application 118 for further query refinement. In this example a separate or integrated results section may present results for the query that was sent, and based on the results, the user may edit the map within inner field 204 to revise the results by adjusting the range or address—all from the single polymorphic query box 202.

Thus, in instances of textual and non-textual queries such as image queries and map queries, the polymorphic query box provides an opportunity for adjusting or editing the query in one interface before the query is completed and sent such as by clicking query icon 210. This allows users to dynamically focus their query.

Example Processes

FIGS. 9-13 are flow diagrams illustrating example processes 900, 1000, 1100, 1200, and 1300 for query box polymorphism consistent with FIGS. 1-8. The processes are illustrated as collections of acts in a logical flow graph, which represents a sequence of operations that can be implemented in hardware, software, or a combination thereof. In the context of software, the blocks represent computer instructions stored on one or more computer-readable media that, when executed by one or more processors, program a computing device 104 to perform the recited operations. Note that the order in which the process is described is not intended to be construed as a limitation, and any number of the described acts can be combined in any order to implement the process, or an alternate process. Additionally, individual blocks may be deleted from the process without departing from the spirit and scope of the subject matter described herein. In various implementations one or more acts of processes 900, 1000, 1100, 1200, and 1300 may be replaced by acts from the other processes described herein.

Figure 9:
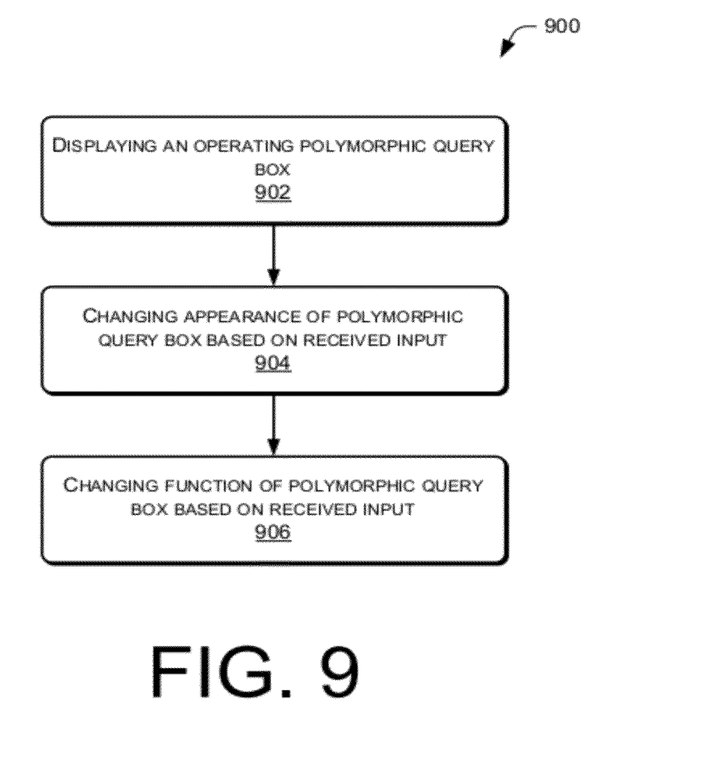
FIGS. 9-13 are flow diagram of example approaches for query box polymorphism.

FIG. 9 presents process 900 of polymorphic behavior of a polymorphic query box 202, according to polymorphic application 118, for example. At 902, polymorphic application 118 causes polymorphic query box 202 operating on computing device 104 to be displayed as part of a graphical user interface on computing device 104. In some implementations the graphical user interface including polymorphic query box 202 is configured based on a screen size of computing device 104.

At 904, polymorphic application 118 changes the appearance of polymorphic query box 202 based on input being received. For example, in some implementations, the appearance can be changed based on one or more of input indicating screen size or input received via input/output interface 108. For instance, in various implementations, the appearance of polymorphic query box 202 is changed based on received input as shown at one or more of 200, 300, 400, 500, 600, 700, or 800. Although, other appearance changes may be made in some implementations. Meanwhile, at 906, polymorphic application 118 changes the function of polymorphic query box 202 based on input being received. For example, in some implementations, functioning of polymorphic query box 202 can be changed based on one or more of input indicating screen size or input received via input/output interface 108. For instance, in various implementations, the function of polymorphic query box 202 is changed based on received input as shown at one or more of 200, 300, 400, 500, 600, 700, or 800. Although, other changes may be made in some implementations.

Figure 10:
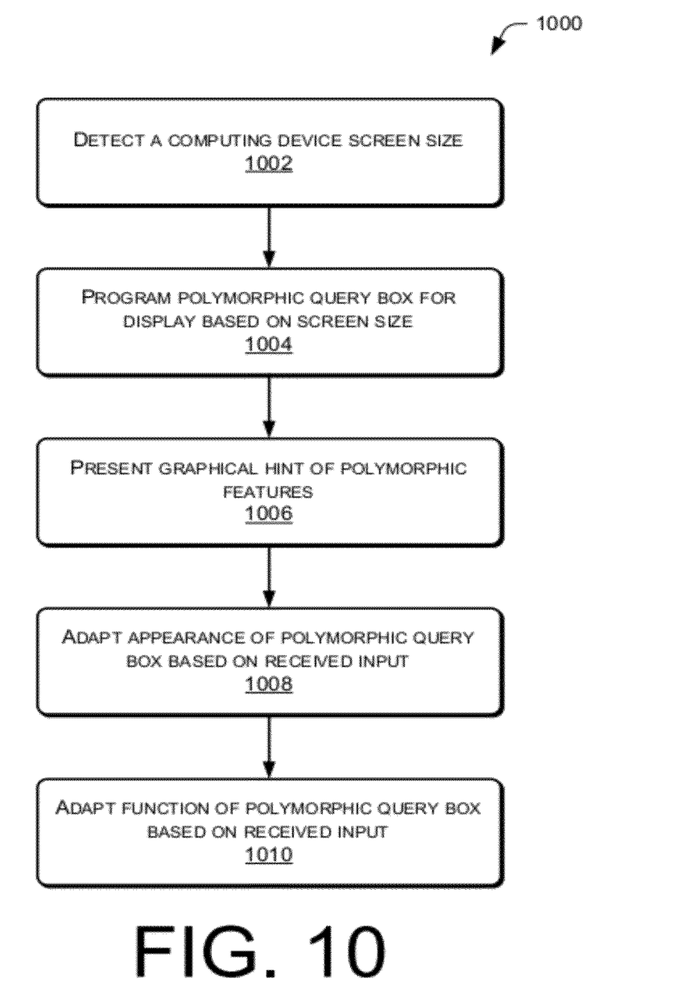

FIG. 10 presents process 1000 of polymorphic behavior of a polymorphic query box 202, according to polymorphic application 118, for example. At 1002, screen size of a computing device 104 is detected. In some implementations the screen size is detected by programming in polymorphic application 118 based on one or more of data from the input/output interface 108, a device identifier (ID) corresponding to computing device 104 or the screen itself, a device registration process, etc.

At 1004, polymorphic application 118 programs polymorphic query box 202 for display in a graphical user interface configured according to the detected screen size. At 1006, as a part of the graphical user interface including polymorphic query box 202, polymorphic application 118 causes a graphical hint of the polymorphic features of the polymorphic query box 202 to be displayed on the screen corresponding to computing device 104. For example, in various implementations, one or more of elements 206 or 212 may be presented and in some instances may be accompanied by one or more of elements 208, 214, 706, 708, 806, 808, 810, or 812. Although, other hints may be used in some implementations.

At 1008, polymorphic application 118 adapts the appearance of polymorphic query box 202 based on input being received via input/output interface 108. For example, in various implementations, the appearance of polymorphic query box 202 is adapted based on received input as shown at one or more of 200, 300, 400, 500, 600, 700, or 800. Although, other appearance adaptations may be made in some implementations. Meanwhile, at 1010, polymorphic application 118 adapts the function of polymorphic query box 202 based on input being received via input/output interface 108. For example, in various implementations, the function of polymorphic query box 202 is adapted based on received input as described regarding one or more of 200, 300, 400, 500, 600, 700, or 800. Although, other adaptations of function may be executed in some implementations.

Figure 11:
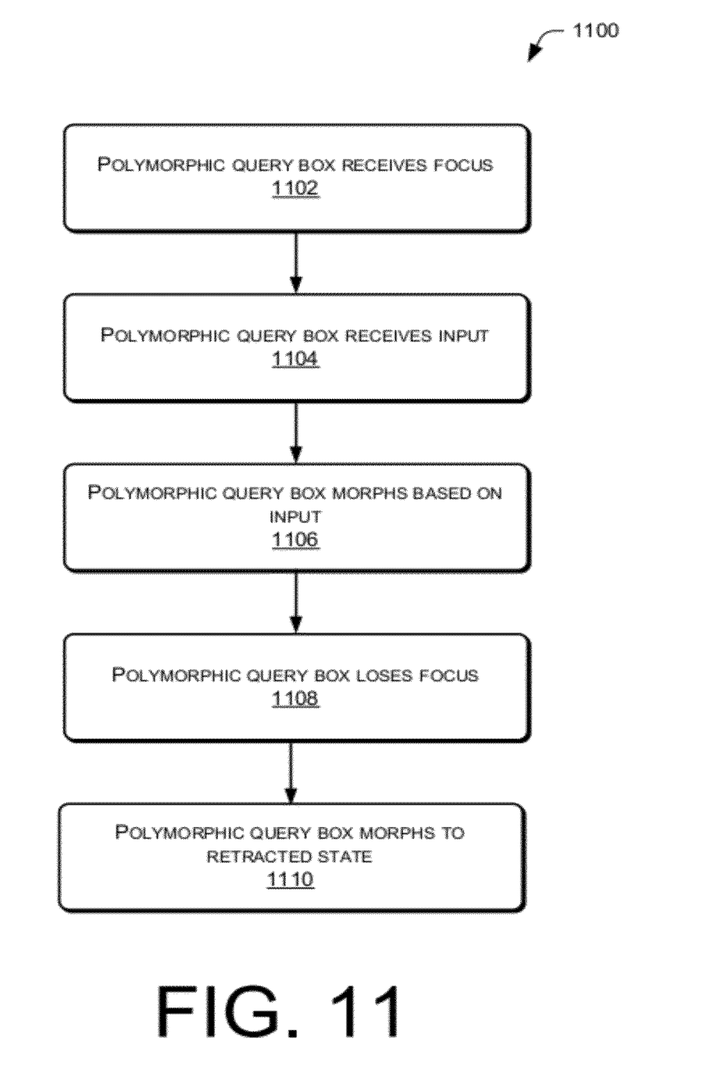

FIG. 11 presents process 1100 of polymorphic behavior of a polymorphic query box 202, for example, which includes, at 1102, inner field 204 of polymorphic query box 202 receiving focus. For instance, inner field 204 receives focus by experiencing a mouse hover event or receiving click input via input/output interface 108. At 1104, inner field 204 of polymorphic query box 202 receives input. For example, the received input may include typed text, segments of text, an image, or a map that is copied and pasted into inner field 204 of polymorphic query box 202.

At 1106, the polymorphic application 118 morphs or changes the presentation of inner field 204 based on the input received at 1104. For instance, when the input is more than a first threshold but less than a second threshold, inner field 204 is morphed to an expanded state. Whereas, when the input is more than the second threshold, but less than a predetermined overflow or offset parameter, inner field 204 is morphed to an expanded state with a scroll bar. Meanwhile, in various implementations, depending on the input scenario determined, e.g., textual, handwriting, image, map, etc., polymorphic query box 202 is enhanced with scenario specific controls.

At 1108, inner field 204 of polymorphic query box 202 loses focus. For instance, inner field 204 loses focus from query icon 210 receiving click input via input/output interface 108, from a user selecting enter, or from a user clicking outside the interface of polymorphic query box 202.

At 1110, polymorphic application 118 morphs or changes inner field 204 of the polymorphic query box 202 to a retracted state based on inner field 204 losing focus at 908.

Figure 12:
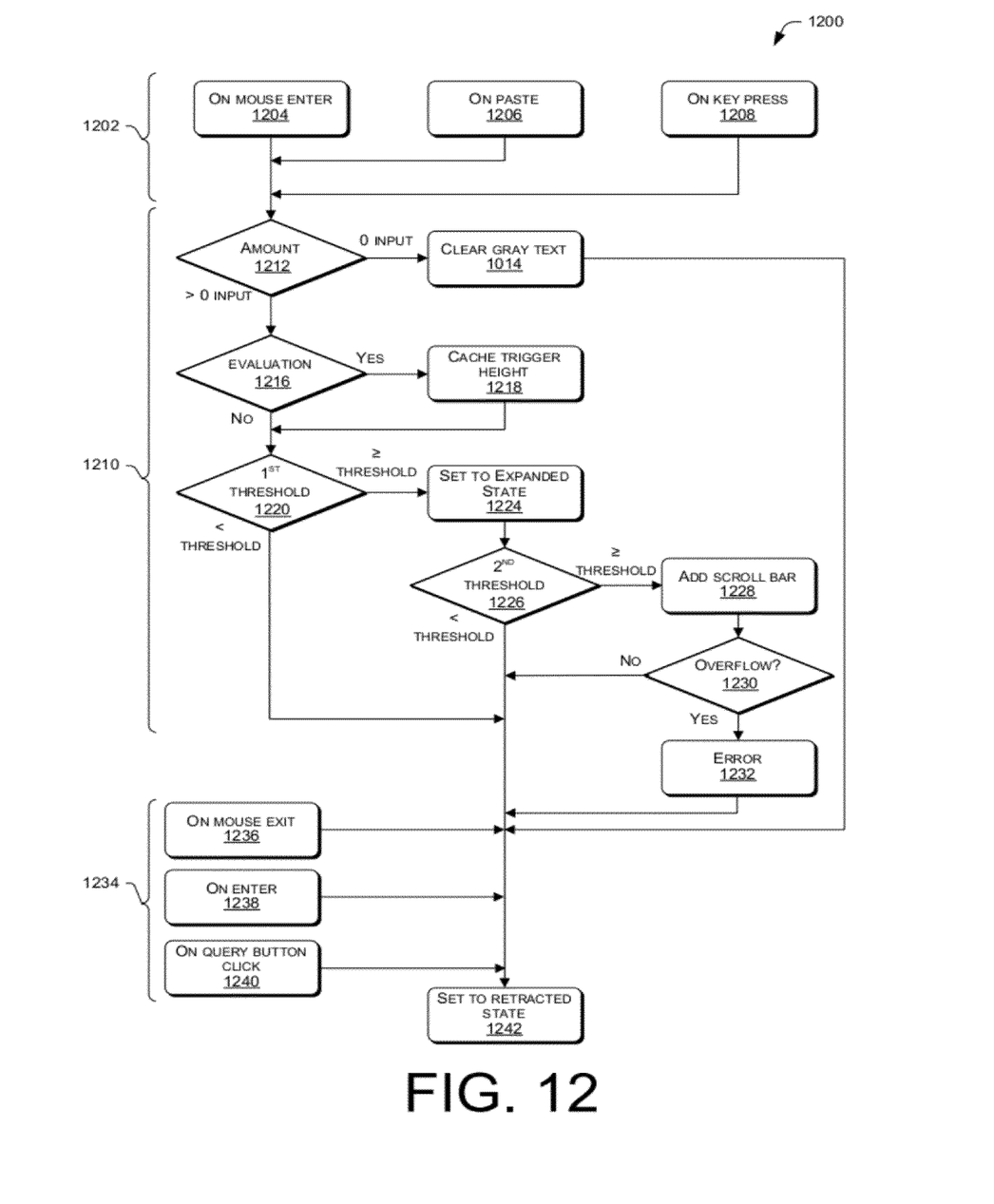

FIG. 12 presents the process 1200, which in some instances represents trigger and response events in polymorphic query box 202. Process 1200 includes, at 1202, events causing inner field 204 of polymorphic query box 202 to receive focus. At 1204, for example, inner field 204 receives focus upon mouse entry or hover over inner field 204. At 1206, as another example, inner field 204 receives focus upon input being pasted into inner field 204. Pasted input can include textual input, image input, map input, etc. At 1208, as another example, inner field 204 receives focus upon input being typed, such as by a key press or touch interface.

Process 1200 includes, at 1210, events causing inner field 204 of polymorphic query box 202 to morph or change appearance and functionality. At 1212, for example, polymorphic application 118 determines an amount of input, which may include a number of characters or lines of text keyed or pasted as well as the size of image or map input. At 1214, when the input amount is zero, polymorphic application 118 clears the gray text 208 from inner field 204. At 1216, when the input is greater than zero, polymorphic application 118 performs an evaluation of the display of the particular client device 104 on which the polymorphic query box 202 is operating. In various implementations, performing the evaluation before comparing the input to several size thresholds optimizes performance of the polymorphic query box 202 by storing the values, scroll height, or offset to later detect overflow. Although, in some instances performing the evaluation at other times may be preferred or added.

At 1218, polymorphic application 118 caches the trigger height of inner field 204. For example, the trigger height may vary based on the display of the client device 104 on which the polymorphic query box 202 is operating. At 1220, polymorphic application 118 tests whether the input is less than a first threshold. In some instances the first threshold represents a single line of input in a non-expanded inner field 204. At 1222, when the input is greater than or equal to the first threshold, inner field 204 is set to an expanded state as shown at 300 or 700, for example. At 1224, polymorphic application 118 tests whether the input is less than a second threshold. In some instances the second threshold represents the expanded state of inner field 204 based on the display of client device 104 on which polymorphic query box 202 is operating. At 1226, when the input is greater than or equal to the second threshold, a scroll bar 402 is added to inner field 204 as shown at 400 or 800, for example. At 1230, polymorphic application 118 compares the amount of input to an overflow or offset value. The overflow or offset value represents a third programmable threshold value to obviate denial of service attacks, for example. In at least one implementation, the third threshold is set to about 2000 characters for textual input or two kilobytes of data for image or map input. Although, in some instances, such as based on the particular computing device 104, any of the threshold values for textual and non-textual data may be set separately. When the input exceeds the third threshold, the polymorphic application 118 enters an error condition at 1232, and an error message may be presented to indicate that the input entered is too large. Meanwhile, assuming that the input is not larger than the third threshold, various events trigger inner field 204 retracting.

Process 1200 includes, at 1234, events causing inner field 204 of polymorphic query box 202 to lose focus. At 1236, for example, inner field 204 loses focus upon mouse exit from inner field 204. In some instances inner field 204 loses focus when the mouse merely exits the field, while in others, inner field 204 loses focus when a part of the client device interface outside the polymorphic query box is activated such as via shortcuts, key press, click, or other user entry. At 1238, as another example, inner field 204 loses focus upon "enter" being selected via a touch interface or an enter key being pressed. At 1240, as another example, inner field 204 loses focus upon query icon button 210 being clicked or selected. At 1242, polymorphic application 118 sets inner field 204 to a retracted state. In various implementations the retracted state is the same as or approximates the initial state with the top portion or a version of the input remaining visible. In other instances the polymorphic query box may provide an indication that the input is being processed while in the retracted state.

Figure 13:
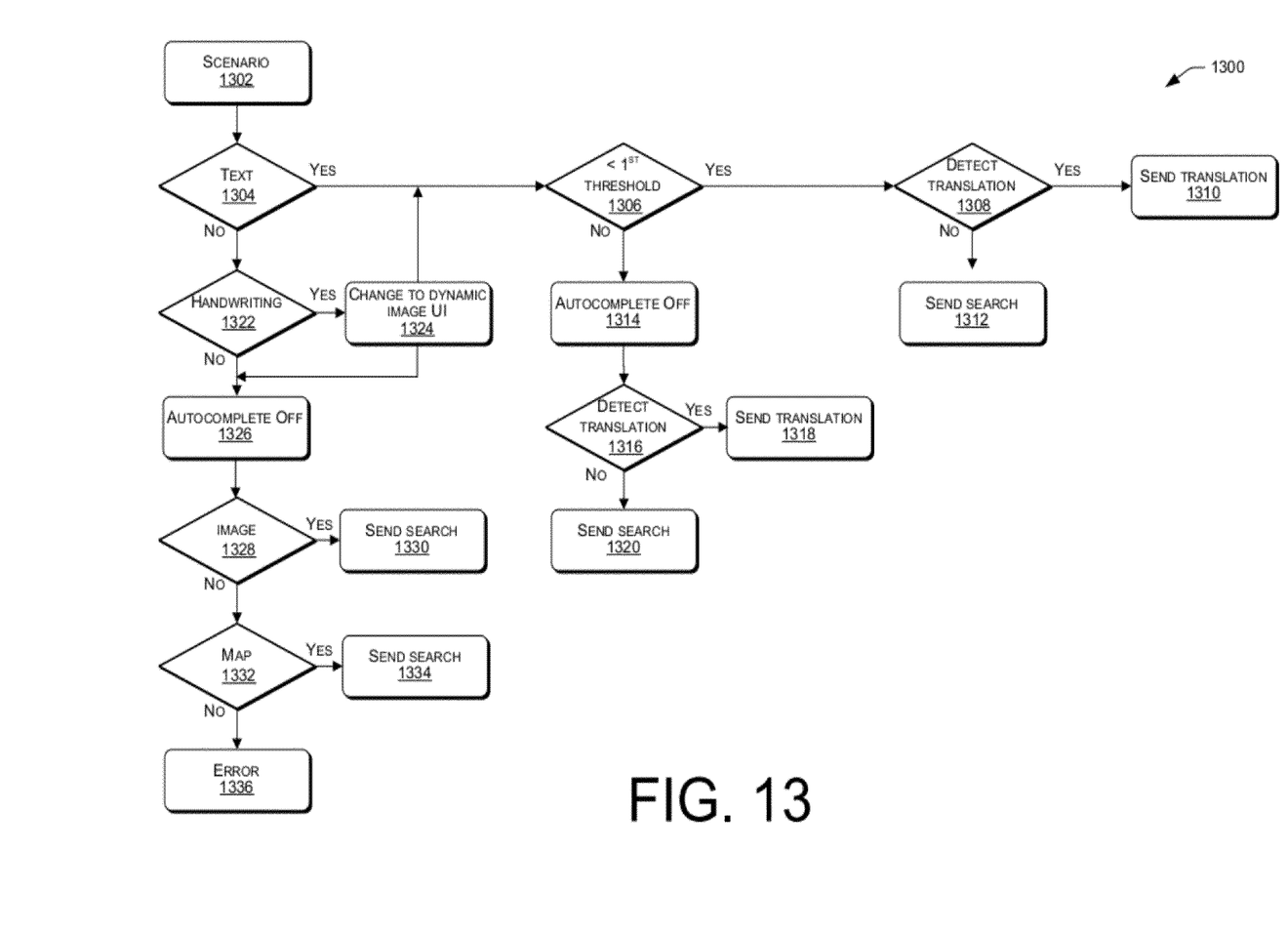

FIG. 13 presents a scenario detection process 1300, which includes, at 1302, polymorphic application 118 ascertaining a scenario based on input being received in inner field 204 of polymorphic query box 202. At 1304, after providing an opportunity for editing, polymorphic application 118 determines whether the input is textual input. For example, polymorphic application 118 may determine that the input is textual based on character entry or Unicode values.

At 1306, when polymorphic application 118 determines that the input is textual, polymorphic application 118 determines whether the text in inner field 204 is less than the first threshold. At 1308, when polymorphic application 118 determines that the text is less than the first threshold, polymorphic application 118 determines whether machine translation is desired. In various implementations the determination of 1308 is made based on one or more of the Unicode values of the input characters relative to the Unicode values of the characters displayed in the polymorphic query box interface, the IP address of the client device, by entry of the new-line character "enter," by selection within the user interface, and/or by other input. At 1310, when polymorphic application 118 detects a desire for machine translation at 1308, the input is sent for machine translation when the query is completed as signaled by clicking query icon 210 or other action to indicate completion. At 1312, when no desire for machine translation is detected, or when a specific intention to search is received, polymorphic application 118 sends the input for search. Although, in several implementations machine translation is implemented as the default textual query scenario.

At 1314, when polymorphic application 118 determines that the input is textual at 1304 and that the text in inner field 204 is not less than the first threshold at 1306, polymorphic application 118 disables autocomplete. At 1316, polymorphic application 118 determines whether machine translation is desired as discussed above regarding 1308. In at least one instance, the input exceeding the first threshold, indicates that machine translation is desired at 1316. At 1318, when polymorphic application 118 detects a desire for machine translation at 1316, the input is sent for machine translation when the query is completed as signaled by clicking the query icon or other action to indicate completion. At 1320, when no desire for machine translation is detected, or when a specific intention to search is received, the polymorphic query box sends the input for search. Although, as discussed above, in several implementations machine translation is implemented as the default textual query scenario.

At 1322, in some implementations, polymorphic application 118 determines whether the input is handwritten text. Handwritten text is text that is entered free-form without using a keyboard or keypad interface. At 1324, in those implementations, inner field 204 changes to a dynamic image user interface where, in addition to editing input that has been stored upon entry, free-form entry is captured. For example, in the handwriting scenario, the autocomplete functionality may present characters that a user may want to select based on the handwritten input being entered. Depending on the handwritten input received, polymorphic application 118 may process the input in the same manner as textual input or as an image input. When polymorphic application 118 processes the handwritten input as textual input, in some instances, polymorphic application 118 may detect that machine translation is desired and bypass other steps to send the input for translation.

At 1326, since the input does not represent text, polymorphic application 118 turns off autocomplete functionality. At 1328, polymorphic application 118 determines whether the input is an image as discussed regarding 700, above. At 1330, after providing an opportunity for image editing, polymorphic application 118 sends the image input for search. At 1332, polymorphic application 118 determines whether the input is a map as discussed regarding 800, above. At 1334, after providing an opportunity for geolocation refinement, polymorphic application 118 sends the map input for search. At 1336, when polymorphic application 118 has not determined an input scenario, polymorphic application 118 may provide an error message.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
   providing, for display on a computing device, a polymorphic query box operating on the computing device in a graphical user interface, the polymorphic query box configured to receive text inputs via an inner field;
   changing appearance and function of the polymorphic query box based at least on the text inputs being received via the inner field of the polymorphic query box, the inner field having an initial size;
   translating the text inputs from a first natural language to a second natural language;
   presenting an integrated results field that is displayed adjacent to the inner field, the integrated results field presenting the second natural language of the text inputs;

receiving changes to the text inputs in the inner field; and
updating the integrated results field based at least in part on the changes to the text inputs.

2. A method as recited in claim 1, further comprising presenting a graphical hint of polymorphic features.

3. A method as recited in claim 2, wherein the graphical hint is not a clickable control.

4. A method as recited in claim 2, wherein, in response to presenting the graphical hint, a cursor controlled by a mouse is provided as a help cursor.

5. A method as recited in claim 4, wherein, in response to an extended hover of the help cursor over the graphical hint, providing hint text to accompany the help cursor.

6. A method as recited in claim 1, wherein the polymorphic query box includes shaded text or colored text that indicates to a user that a query box functions as polymorphic and that the query box can accept a variety of inputs, wherein the shaded text or the colored text is cleared responsive to the inner field of the polymorphic query box receiving focus.

7. A method as recited in claim 1, further comprising, in response to an amount of text being entered that exceeds initial boundaries of the inner field:
deactivating autocomplete;
expanding the inner field; and
presenting a graphical hint of polymorphic features to indicate changed function of the polymorphic query box.

8. A method as recited in claim 7, further comprising, in response to an amount of text being deleted such that remaining text will fit in the initial boundaries of the inner field:
reactivating autocomplete;
retracting the inner field to the initial size; and
removing the graphical hint of polymorphic features to indicate changed function of the polymorphic query box.

9. A method as recited in claim 7, further comprising, in response to an amount of text being entered that exceeds an expanded inner field, adding scroll bars between the text and a query icon of the polymorphic query box.

10. A method as recited in claim 9, further comprising, in response to an amount of text being deleted such that remaining text will fit in an expanded inner field, removing the scroll bars.

11. A method as recited in claim 7, further comprising, responsive to receiving a click out of the inner field:
retracting the inner field to the initial size; and
removing the graphical hint of polymorphic features to indicate changed function of the polymorphic query box.

12. A method as recited in claim 11, further comprising, responsive to receiving a subsequent click in the inner field expanding the inner field.

13. The method as recited in claim 1, wherein the polymorphic query box is further configured to receive image inputs.

14. The method as recited in claim 1, wherein the function of the polymorphic query box further includes web search.

15. A computer storage medium having encoded thereon computer-executable instructions to configure a computing device to perform operations comprising:
presenting a polymorphic query box including an inner field for a graphical user interface, the inner field of the polymorphic query box configured to receive an image input;
presenting a graphical hint of polymorphic features of the polymorphic query box; and
adapting appearance and function of the polymorphic query box to include image editing controls to modify the image input based at least in part on the image input being received via the inner field, wherein the image editing controls include at least one of an area selection control, a cropping control, or a color selection control.

16. A computer storage medium as recited in claim 15, wherein the image input includes a plurality of objects, and wherein the operations further comprise:
presenting an integrated results field that is displayed adjacent to the inner field, the integrated results field presenting results associated with the plurality of objects;
receiving changes to the image input via the image editing controls to remove a portion, but not all, of the plurality of objects; and
in response to receiving the changes, updating the integrated results field.

17. A display device comprising:
one or more processors;
a graphical user interface executable on the one or more processors, the graphical user interface being configured to:
display a polymorphic query box operating from client side logic, the polymorphic query box configured to receive an image input of a map;
display a pictorial hint of polymorphic features of the displayed polymorphic query box;
an expansion feature causing the displayed polymorphic query box to expand responsive to receiving input exceeding a threshold; and
a function adaptation feature causing the displayed polymorphic query box to present map editing controls in response to receiving the image input of the map, wherein the map editing controls enable entering a geographic distance range, a specific location, or a geolocation to pinpoint a location on the map.

18. A display device as recited in claim 17, wherein the image input of the map includes an image of a geographical city or transportation system.

* * * * *